(12) United States Patent
Tani

(10) Patent No.: US 8,750,605 B2
(45) Date of Patent: Jun. 10, 2014

(54) SEARCHABLE COLOR ENCODED FILE COMPOSING METHOD AND SEARCHABLE COLOR ENCODED FILE SYSTEM

(75) Inventor: Okie Tani, Tokyo (JP)

(73) Assignee: Tani Electronics Corporation, Tokyo (JP)

( * ) Notice: Subject to any disclaimer, the term of this patent is extended or adjusted under 35 U.S.C. 154(b) by 621 days.

(21) Appl. No.: 12/891,189

(22) Filed: Sep. 27, 2010

(65) Prior Publication Data

US 2011/0081077 A1 Apr. 7, 2011

(30) Foreign Application Priority Data

Oct. 2, 2009 (JP) ................................. 2009-230637

(51) Int. Cl.
*G06K 9/00* (2006.01)
(52) U.S. Cl.
USPC ........... 382/162; 382/164; 382/165; 382/235; 358/515; 358/538
(58) Field of Classification Search
USPC .......... 382/164, 165, 235, 243, 305; 358/515, 358/538, 448
See application file for complete search history.

(56) References Cited

U.S. PATENT DOCUMENTS

| | | | |
|---|---|---|---|
| 6,411,806 B1 * | 6/2002 | Garner et al. ................. | 455/428 |
| 6,449,632 B1 * | 9/2002 | David et al. ................... | 709/202 |
| 6,477,370 B1 * | 11/2002 | Sigler et al. ................... | 455/427 |
| 6,524,739 B1 * | 2/2003 | Iwaizono et al. .............. | 429/61 |
| 6,529,731 B2 * | 3/2003 | Modzelesky et al. ......... | 455/427 |
| 6,850,497 B1 * | 2/2005 | Sigler et al. ................... | 370/310 |
| 7,142,710 B2 | 11/2006 | Hung | |
| 7,358,502 B1 * | 4/2008 | Appleby et al. .......... | 250/370.14 |
| 7,536,595 B1 * | 5/2009 | Hiltunen et al. ............... | 714/26 |
| 7,873,232 B2 * | 1/2011 | Malik ............................ | 382/274 |
| 7,906,555 B2 * | 3/2011 | Flynn et al. .................... | 514/602 |
| 7,953,204 B2 * | 5/2011 | Sumanaweera et al. ........ | 378/65 |
| 8,067,748 B2 * | 11/2011 | Balakin .................. | 250/396 ML |
| 8,188,688 B2 * | 5/2012 | Balakin ......................... | 315/503 |
| 8,200,527 B1 * | 6/2012 | Thompson et al. .......... | 705/7.39 |

(Continued)

FOREIGN PATENT DOCUMENTS

CN 1790178 A 6/2006
CN 1953503 A 4/2007

(Continued)

OTHER PUBLICATIONS

Jul. 6, 2012 Office Action issued in Chinese Patent Application No. 2010105092919 (with translation).

(Continued)

*Primary Examiner* — Yosef Kassa
(74) *Attorney, Agent, or Firm* — Oliff PLC

(57) ABSTRACT

A searchable color encoded file composing method having a step of converting a plurality of document files etc. to color image files based on information replacement type color conversion processing, a step of storing a plurality of color image files prepared by the color conversion processing in a hard disk, a step of searching through the plurality of color image files stored in the hard disk by a color key, and a step of preparing a list of the color image files hit by the search. Due to this, key search technology is added in coding technology utilizing color and therefore the storage and handling of color encoded files are eased.

24 Claims, 13 Drawing Sheets

(56) References Cited

U.S. PATENT DOCUMENTS

| | | | |
|---|---|---|---|
| 8,233,681 B2 * | 7/2012 | Aylward et al. | 382/128 |
| 8,423,565 B2 * | 4/2013 | Redlich et al. | 707/758 |
| 2005/0179915 A1 | 8/2005 | Tsukada | |
| 2008/0154873 A1 | 6/2008 | Redlich et al. | |
| 2009/0034869 A1 | 2/2009 | Malik | |

FOREIGN PATENT DOCUMENTS

| | | |
|---|---|---|
| CN | 1956050 A | 5/2007 |
| CN | 101136998 A | 3/2008 |
| CN | 101287061 A | 10/2008 |
| JP | A 2003-233310 | 8/2003 |
| JP | B2 4062924 | 3/2008 |
| JP | A 2008-131206 | 6/2008 |
| JP | A 2008-244927 | 10/2008 |
| JP | A-2009-139722 | 6/2009 |

OTHER PUBLICATIONS

Jan. 29, 2013 Office Action issued in Chinese Patent Application No. 2010105092919 (with translation).

Aug. 8, 2013 Office Action issued in Chinese Patent Application No. 2010105092919 (with translation).

* cited by examiner

FIG. 5

| | COLOR CONVERSION PROCESSING | |
|---|---|---|
| | INFORMATION REPLACEMENT ROUTE | INFORMATION CONVERSION ROUTE |
| PROCESSING SCHEME | REPLACEMENT PROCESSING SUBSTITUTION PROCESSING | CONVERSION PROCESSING |
| DATA COVERED | BYTE DATA (OBJECT) | BYTE DATA (OBJECT) BINARY DATA |
| ENCODING MEDIATION DATA | COLOR ENCODING TABLE COLOR DECODING TABLE | COLOR ENCODING KEY |
| | COLOR CONVERSION TABLE COLOR INVERSE CONVERSION TABLE | COLOR CONVERSION KEY |
| | COLOR CODE TABLE ONC CORRESPONDENCE TABLE | |
| ENCODING METHOD | SAME AS ABOVE | RANDOM NUMBER SHUFFLE |

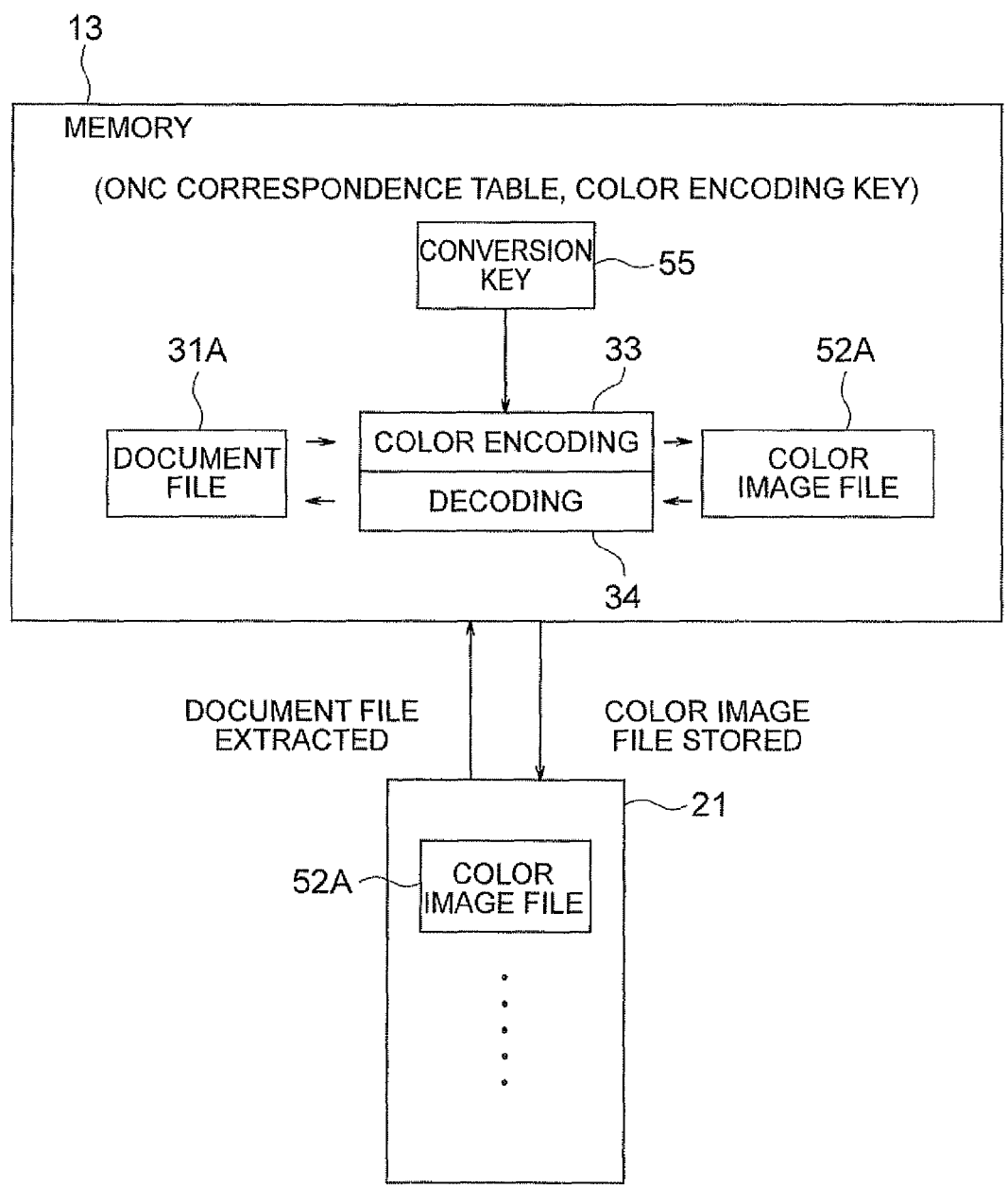

SEARCHABLE COLOR ENCODED FILE COMPOSING METHOD AND SEARCHABLE COLOR ENCODED FILE SYSTEM

BACKGROUND OF THE INVENTION

1. Field of the Invention

The present invention relates to a searchable color encoded file composing method and a searchable color encoded file system, more particularly relates to a searchable color encoded file composing method and searchable color encoded file system enabling a key search in regions of color image files prepared based on information replacement type conversion elements utilizing color.

2. Description of the Related Art

The present assignee previously proposed an encoding method and encoding system utilizing color (Japanese Patent Publication (A) No. 2009-139722). This encoding method etc. encoded computer objects (files of documents and design drawings, etc., and executable files of programs) handled by the conventional computer system such as the PCs on the computer systems etc. They utilized color data to convert the computer objects to a state not able to be recognized as data and placed the data in the memory of a computer system etc. The above computer objects were converted to color image files prepared based on a color code based on the RGB etc.

In general, in computer encoding technology, in the past, it was not possible to run a key search in the state of the encoded files. The encoding technology basically was technology for preventing leakage of information. However, if considering convenience, it is desirable to be able to run a key search in the state of the encoded files as they stand. It is desirable to add key search technology to the encoding technology etc. to improve the convenience.

SUMMARY OF THE INVENTION

An object of the present invention, in view of the above issue, is to provide a searchable color encoded file composing method and searchable color encoded file system adding key search technology to encoding technology utilizing color so as to improve the convenience in storing and handling color encoded files.

The searchable color encoded file composing method and searchable color encoded file system according to the present invention are configured as follows for achieving the above object.

The searchable color encoded file composing method according to the present invention comprises a step of converting a plurality of document files or image files to color image files based on information replacement type color conversion processing, a step of storing the plurality of color image files prepared in the color conversion processing in a storage memory, a step of searching through the plurality of color image files stored in the storage memory by a color key, and a step of preparing a list of color image files hit by the search.

The above searchable color encoded file composing method further comprises a step of converting a search key for searching through the plurality of document files or image files by the color conversion based on the information replacement type color conversion processing so as to prepare the color key.

In the above searchable color encoded file composing method, the means for performing the information replacement type color conversion processing is prepared based on an ONC correspondence table.

Another searchable color encoded file composing method according to the present invention comprises a step of converting a plurality of document files or image files to first color image files based on information conversion type binary type color conversion processing, a step of converting the plurality of document files or image files to second color image files based on information replacement type color conversion processing, a step of combining the first color image file and second color image file for each of the plurality of document files or image files to prepare third color image files, a step of storing the plurality of third color image files in a storage memory, a step of searching through the plurality of third color image files stored in the storage memory by a color key, and a step of preparing a list of the third color image files hit by the search.

Still another searchable color encoded file composing method according to the present invention comprises a step of converting a plurality of nondocument files not able to be searched by a key search to first color image files based on information conversion type binary type color conversion processing, a step of imparting related text to the plurality of nondocument files, a step of converting the plurality of text-carrying nondocument files to second color image files based on information replacement type color conversion processing, a step of combining the first color image file and second color image file for each of the plurality of nondocument files to prepare third color image files, a step of storing the plurality of third color image files in a storage memory, a step of searching through the plurality of third color image files stored in the storage memory by a color key, and a step of preparing a list of the third color image files hit by the search.

A searchable color encoded file system according to the present invention is a searchable color encoded file system used in a single computer or its peripheral device or a computer system comprised of a plurality of computers connected by a communication line, provided with a converting means for converting a plurality of document files or image files to color image files based on information replacement type color conversion processing, a storing means for storing the plurality of color image files prepared in the color conversion processing in a storage memory, a searching means for searching through the plurality of color image files stored in the storage memory by a color key, and a list preparing means for preparing a list of color image files hit by the search.

In the above constitution, the color key is prepared by converting a search key for searching through the plurality of document files or image files by the color conversion based on the information replacement type color conversion processing.

In the above constitution, the means for performing the information replacement type color conversion processing is an ONC correspondence table.

Another searchable color encoded file system according to the present invention has a first converting means for converting a plurality of document files or image files to first color image files based on information conversion type binary type color conversion processing, a second converting means for converting the plurality of document files or image files to second color image files based on information replacement type color conversion processing, a combining means for combining the first color image file and second color image file for each of the plurality of document files or image files to prepare third color image files, a storing means for storing the plurality of third color image files in a storage memory, a searching means for searching through the plurality of third color image files stored in the storage memory by a color key, and a list preparing means for preparing a list of the third color image files hit by the search.

Another searchable color encoded file system according to the present invention is provided with a first converting means for converting a plurality of nondocument files not able to be searched by a key search to first color image files based on information conversion type binary type color conversion processing, an imparting means for imparting related text to the plurality of nondocument files, a second converting means for converting the plurality of text-carrying nondocument files to second color image files based on information replacement type color conversion processing, a combining means for combining the first color image file and the second color image file to prepare a third color image file for each of the plurality of nondocument files, a storage executing means for storing the plurality of third color image files in a storage memory, a searching means for searching through the plurality of third color image files stored in the storage memory by a color key, and a list preparing means for preparing a list of third color image files hit by the search.

In the above, character codes are used for the part of the object list of the ONC correspondence table.

In the above, a dictionary including a predetermined number of word data is used for the part of the object list of the ONC correspondence table.

In the above, elements comprised of a file format and character code are used for the part of the object list of the ONC correspondence table.

In the above, elements comprised of a file format and a dictionary including a predetermined number of word data are used for the part of the object list of the ONC correspondence table.

In the above, when the document files or image files are in a binary form, text is extracted from the document files or image files by a document filter corresponding to the file format, then the plurality of document files or image files are converted to color image files based on the ONC correspondence table.

In the above, text objects of text are converted to color through color numbers based on the ONC correspondence table.

According to the present invention, the following meritorious effects are exhibited:

(1) In color encoding technology converting document files, executable files, etc. (object files) handled by a computer using color data to a state where the content of the data cannot be recognized and storing it on the computer, it is possible to utilize an information replacement type conversion function to prepare a search use color key so as to enable a key search of the encoded files comprised of the color image files as they are and therefore enable improvement of convenience and enable the added value of the capability of a key search to color encoding technology.

(2) Since key search technology is added in encoding technology using color, the storage and handling of color encoded files can be made easier.

(3) Further, there is the effect that even prior nondocument files not able to be searched by text searches can be searched by text searches in the state of color encoded color image files.

BRIEF DESCRIPTION OF THE DRAWINGS

The above objects and features of the present invention will become clearer from the following description of the preferred embodiments given in relation to the attached drawings, wherein:

FIG. 5 is a table comparing two types of color conversion processing (information conversion type and information replacement type), FIG. 6 is a block diagram for explaining the color conversion technology executed on a computer.

DESCRIPTION OF THE PREFERRED EMBODIMENTS

Below, preferred embodiments of the present invention will be explained based on the attached drawings.

Figure 1:
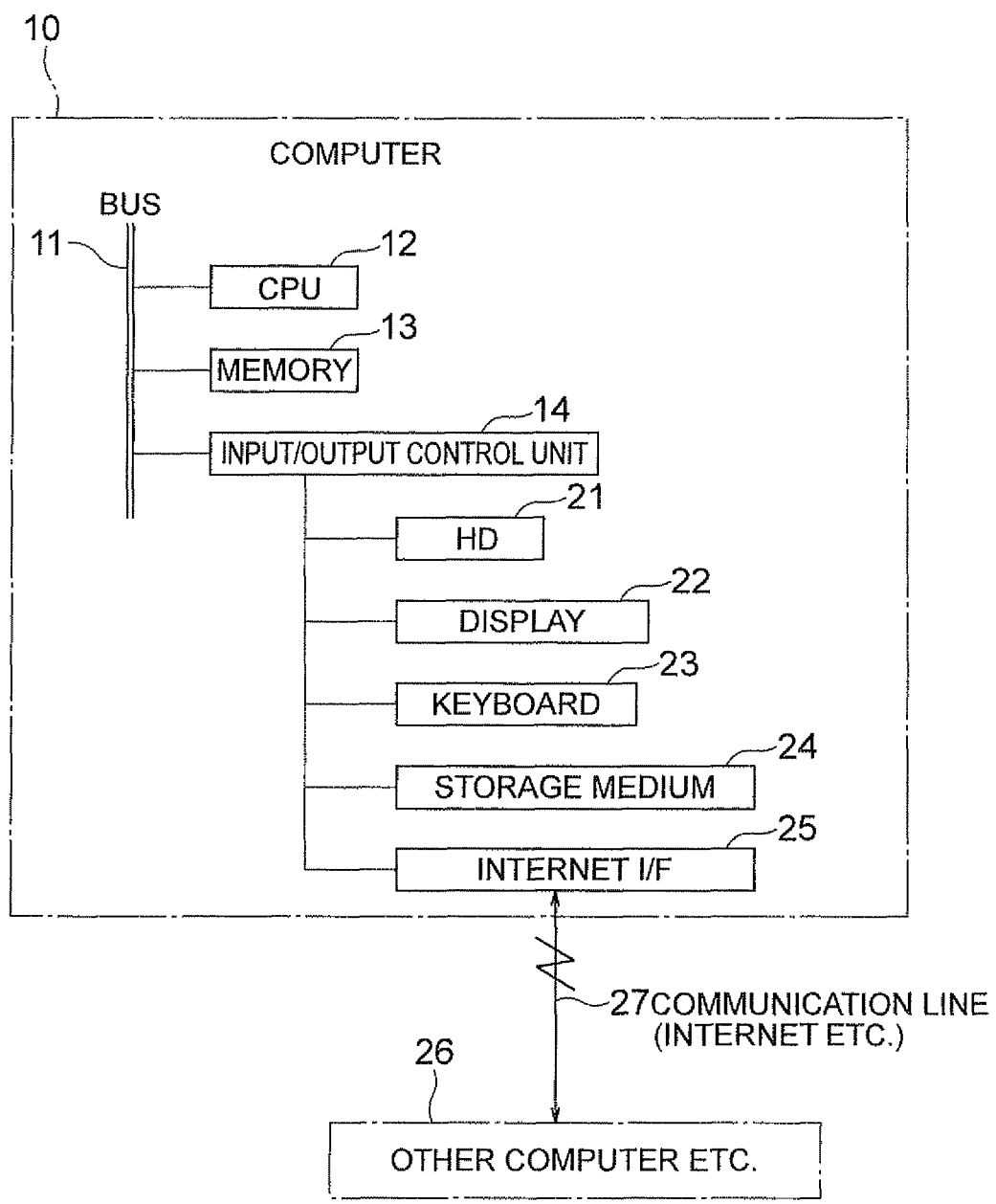
FIG. 1 is a block diagram showing the hardware configuration of a computer etc. in which a searchable color encoded file composing method according to the present invention etc. is incorporated.
Figure 2:
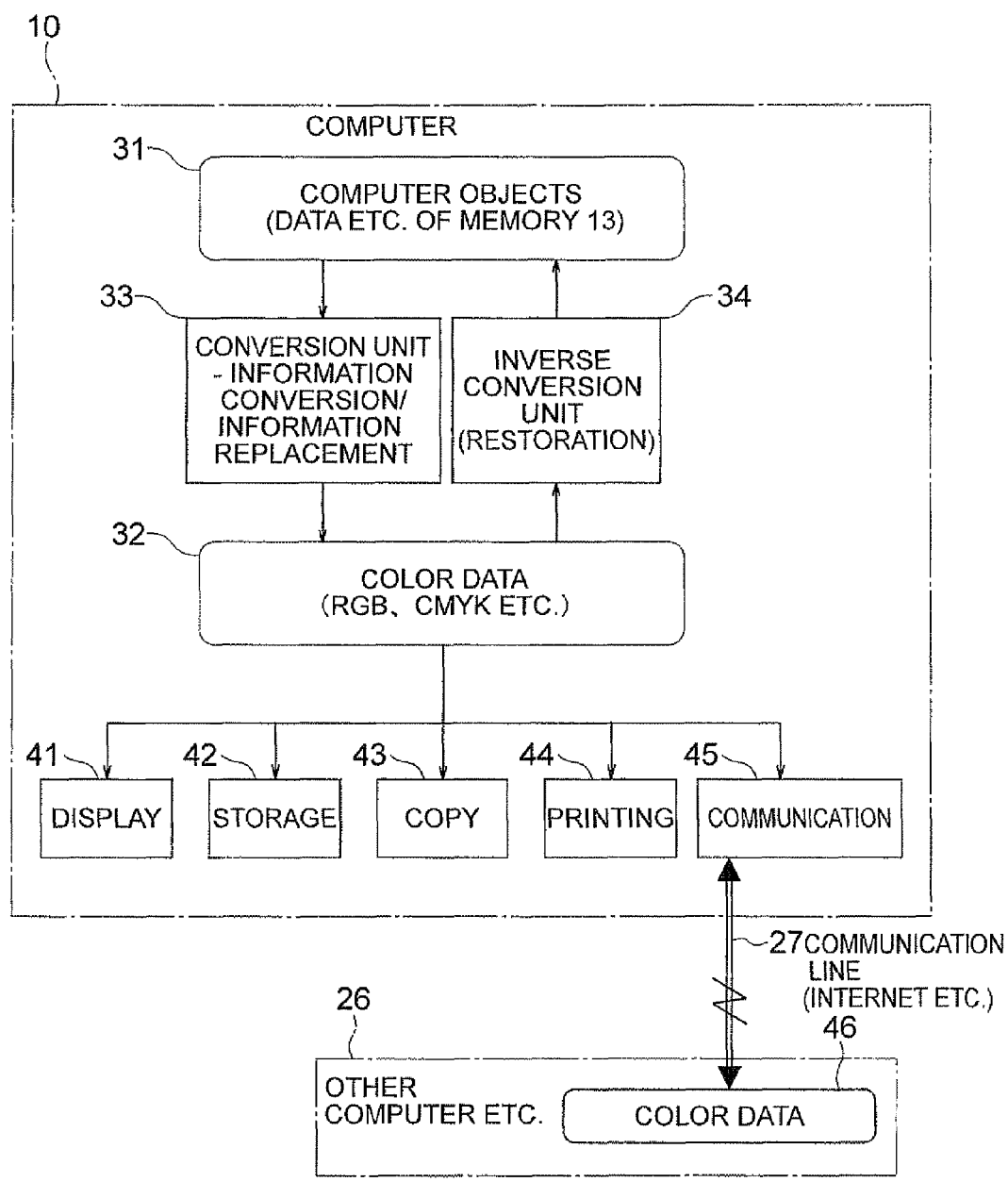
FIG. 2 is a block diagram showing main components of a computer etc. in functional terms.

FIG. 1 shows the configuration of a computer system in which a searchable color image file system according to the present invention is realized. Note that in this computer system, it is assumed that a device using an encoding method using color (encoding device) is included. FIG. 2 is a block diagram showing key parts of the functional configuration of the computer.

FIG. 1 and FIG. 2 show a single computer 10 in a closed computer system based around a computer network (closed computer system). The computer 10 is provided with components connected to each other via a bus 11 such as a CPU (central processing unit) 12, memory 13, and I/O control unit 14. Further, the I/O control unit 14 may also be connected to a storage memory comprised of a hard disk (HD) 21, an output device comprised of for example a display 22, an input device comprised of for example a keyboard 23, a portable type storage medium 24, and an Internet interface (Internet I/F) 25 for sending and receiving signals (communicating) with an external device over the Internet. Note that the Internet interface 25 may also be a general communication unit.

As the types of the above storage medium 24, there are for example a flexible disk (FD), compact disk (CD), DVD, USE memory, etc. These storage media 24 are set in the computer 10 through drives etc.

These components 21 to 25 send and receive data through the I/O control unit 14 and bus 11 with the CPU 12. The external device is at least one other computer 26. The computer 10 and the other computer 26 can communicate with each other through the Internet, a LAN, or other communication line 27 to send and receive program, data, and other data and information.

In the above constitution, the memory 13 is a main memory which includes a working memory temporarily storing data finished being processed by the CPU 12 or data in the middle of processing. The hard disk 21 is a storage medium for storing data produced by processing by the CPU 12 and temporarily held in the memory 13. Further, the storage medium 24 is an external memory which functions as a portable type storage memory.

Note that the above computer 10, as is well known, includes a general use personal computer (PC) or computer of a server etc. or a computer of a dedicated device. The latter computer of a dedicated device is an intelligent device in which the above CPU 12 is built. For example, it is a fixed type or portable type game machine or mobile phone including a CPU 12, that is, a device designed for a specific application. In the case of a computer of a dedicated device, provision of the above storage medium 24 is limited by the design of the device. For example, as the storage memory, as is well known, a semiconductor memory (RAM or ROM) is used.

When expressing the computer 10 having the hardware configuration shown in FIG. 1 by its functional configuration, the result becomes as shown in FIG. 2.

In FIG. 2, the block 10 indicates the above computer. Further, in FIG. 2, the block 31 shows the entirety of the data etc. held in for example the memory 13, hard disk 21, etc. The data etc. of the block 31 includes documents, text, symbols, graphics, numerical formulas, images, audio, and other data and information handled by the computer 10 (including programs). The data etc. comprise the above-mentioned "computer objects". The block 31 is described as the "computer objects".

Note that the computer objects 31 are objects which can be handled by peripheral devices of the computer 10, various related devices, or a computer system comprised of a plurality of computers connected over a communication line.

The computer objects 31 exist in a PC (personal computer) or other computer in a normally or constantly accessible state. The computer objects 31 form data files (object files) routinely handled on the computer 10. The types of the above data files (object files), by a first method of classification, include document files and image or drawing files (design drawing files etc.) Document files are files including at least data of "documents" and are files which can be searched by a key search (search by keywords) based on conventionally known search technology. As examples of document files, there are files produced by the commercially available work processing software, spread sheet software, document software, etc. HTML and other multimedia files are also included. Further, as the data of "documents", there is for example text data. The image files are mainly comprised of "graphic" data, but also include "document" data for explaining the graphics. As the image files, there are design drawing files of electronic circuits, electrical circuits, mechanical designs, etc. Key search of the image files is also possible based on the data parts of "documents" in image files.

Further, as the method for second classification of the type of the above data files, there are document files and nondocument files. The document files are explained above. On the other hand, the nondocument files are files comprised of only data which cannot be searched by the key search. As examples of the nondocument files, there are audio files, files of only images, execution type files (or executable files of programs), and dynamic link libraries, etc.

Furthermore, when the computer 10 is the above-mentioned dedicated device of a game machine etc., the computer objects 31 only naturally include, in addition to the above usually handled data files, game software programs or game-specific files.

According to the searchable color encoded file composing method etc. of the present invention etc., when applied to a computer of a game machine etc., it is possible to encode the game software program etc. and prevent illicit use. Further, even when encoding the game software, it is possible to search through the game software having various functions which one desires to use in the encoded state.

Further, when the computer 10 is a general use device, as explained above, even general software included in the computer objects, that is, a "program", is encoded. Even when the general software is encoded, it is possible to search through software having various functions which one desires to use in the encoded state.

Further, the block 32 indicates the entirety of "color" coded by the coding method using color or data relating to "color" (hereinafter referred to as the "color data"). The color data 32 is RGB or CMYK or other data expressing the color.

Here, the "color" means the several million types of colors which are handled as data in a computer and can be displayed on its screen. The "color" is in principle a physical presence which usual people recognize by their visual senses based on visible light. If displaying that color on the screen of the display 22 of the computer 10, the color is recognized as a display based on the combination of colors on the screen, that is, an image of the "color code", by human sight.

Note that the above "color data" is "color digital values". The "color digital values" are digital values depending on the attributes of color and assigned when treating color as data on a computer.

The computer objects 31 are converted to color data 32 by the conversion unit 33. The conversion functions of the conversion unit 33 include the two types of conversion functions of the "information conversion type conversion function" and the "information replacement type conversion function". The two types of conversion functions are selectively used.

The color data 32 prepared by the "information conversion/information replacement" function (information conversion function or information replacement function) of the conversion unit 33, that is, the function of "color encoding", enables the display of a specific color code image if displayed on the screen of the display 22. Here, "color code image" is synonymous with "color image". The color data 32 itself forms a color file in part of the memory 13 etc. of the computer 10 or on the hard disk 21.

As explained above, the computer objects 31 are formed as object files, so the above document files etc. are converted by the conversion unit 33 to color image files.

In the above, the computer objects 31 and the color data 32 are linked. The computer objects 31 are linked with the color data 32 by the "information conversion/information replacement" function of the conversion unit 33.

The "information conversion/information replacement" function of the conversion unit 33, as explained later, is comprised of the function of "information conversion (conversion)" in the usual sense and the function of simple "information replacement (replacement)". The function of information replacement may further be a substitution function. For the conversion functions of the conversion unit 33, whether "information conversion" or "information replacement" is used is determined by the content of the computer object 31. For example, document data of byte data is processed by information replacement, while compressed data, programs, etc. of binary data are processed by information conversion. However, while byte data can be processed by information conversion and information replacement, binary data can only be processed by information conversion. In actuality, "information conversion" and "information replacement" are separate processing depending on the computer object 31, but are treated together as the "information conversion/information replacement" function of the conversion unit 33.

Further, conversely, if converting the color data 32 by the inverse conversion unit 34, it is returned to a computer object 31.

The above conversion unit 33 uses processing using a color conversion table (ONC correspondence table, QC correspondence table, or replacement program) or color conversion key (color coding key or coding program) provided in the hard disk 21 etc. as the basis to realize the "information conversion/information replacement" function. Note that the "color conversion table" is a "color encoding key" in the broad sense.

Further, the inverse conversion unit 34 similarly uses a color inverse conversion table (ONC correspondence table, OC correspondence table, or replacement program) or color conversion key (color decoding key) provided in the hard disk 21 etc. as the basis to realize the inverse conversion function ("restoration" function).

The color inverse conversion table is the above color conversion table used in the inverse direction. As correspondence tables, the directions of conversion are merely switched. They can be said to be substantially the same.

When a computer object 31 is converted by the conversion unit 33 to color data (color image file) 32, it is not possible to directly recognize and learn the content of the original computer object 31 based on that color data 32. When desiring to recognize the color data 32 as the computer object 31, it is necessary to use the inverse conversion unit 34 to restore it to its original state. Due to this, it is possible to encrypt or protect data etc. stored in the memory 13, hard disk 21, etc. of the computer 10.

Further, in FIG. 2, a block 41 shows the display function for displaying a color code image based on the color data 32 on the screen of the display 22. A block 42 shows the storage function for storing color data 32, that is, a color image file, on the hard disk 21. A block 43 shows a copy function executed by the copying CPU 12 and preparing a copy of the color data 32. A block 44 shows the function for printing an image of a color code through one of the output devices, that is, a printer. A block 45 shows a communication function for transferring data, information, etc. with another computer 26 through a communication line 27 in the form of color data 32. A block 46 shown inside the computer 26 shows the color data sent from the computer 10 and stored in the storage memory in the computer 26.

As explained above, inside the computer 10, when the computer object 31 is converted to the color data 32, basically it is stored in the state of the color data 32. That is, it is stored in the hard disk 21 or other storage memory of the computer 10 as a plurality (or large number) of color image files (color encoded files). Further, after that, it is treated as coded information and displayed, stored, copied, printed, and communicated without being returned to a computer object 31. Further, even when the computer 10 communicates with another computer 26 etc. at the outside through a communication line 27, the data flowing along the communication line 27 is in the form of the color data 32. Even if another party acquires the color data 32, it cannot steal the information. Further, the other computer 26 cannot recognize the original computer object 31 if in the state of the color data 32. Provision of an inverse conversion unit 34 at the computer 10 enables the content of the computer object 31 to be acquired and utilized.

Next, the "information conversion/information replacement" and "information inverse conversion (restoration)/information inverse replacement" between the computer object 31 and the color data 32 based on the conversion unit 33 and the inverse conversion unit 34 will be explained in detail.

Figure 3:
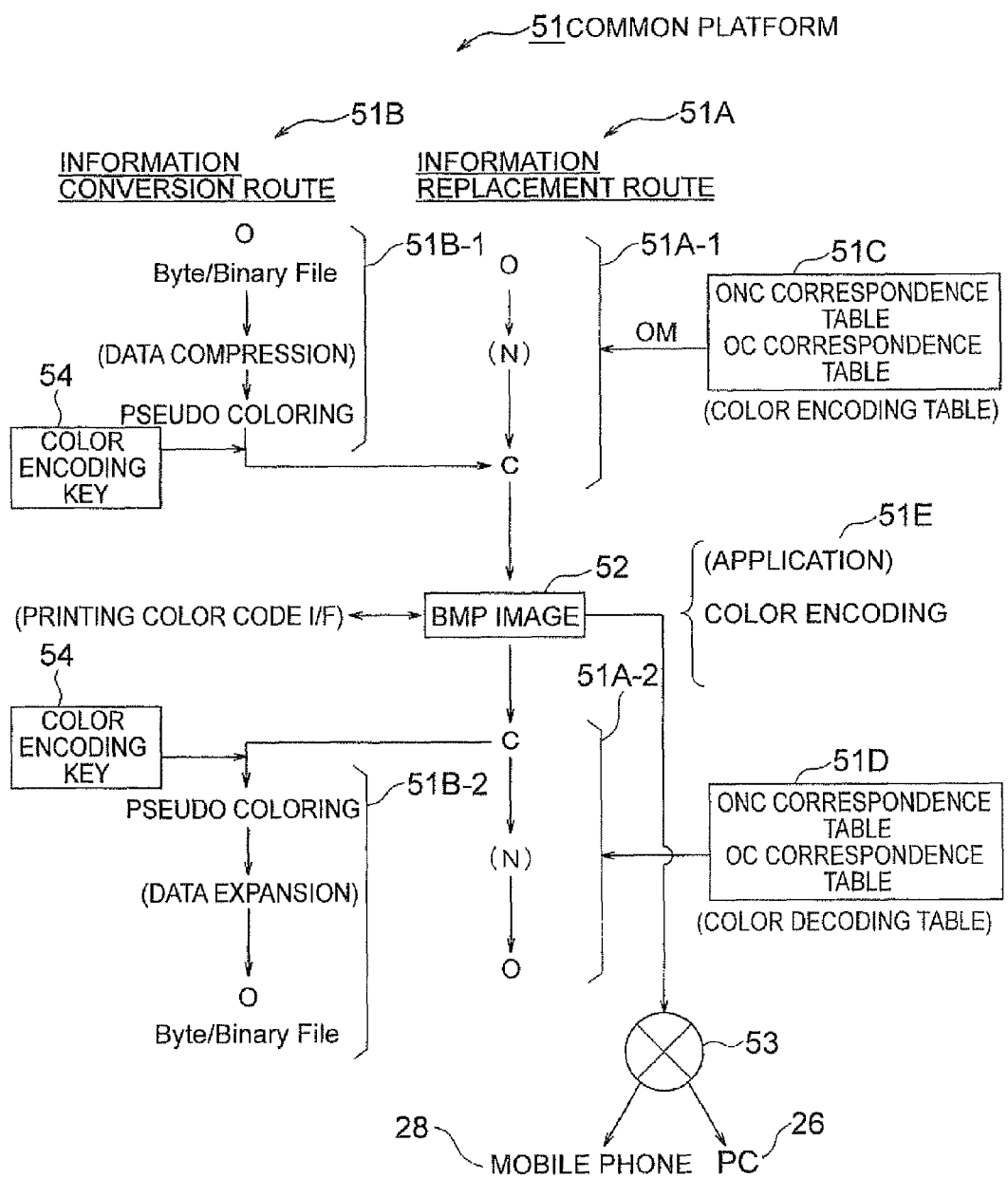
FIG. 3 is a view of the overall system configuration for illustrating conversion and inverse conversion between a computer object and color data in a computer etc.

Referring to FIG. 3, the overall system configuration relating to the conversion and inverse conversion of the computer object (object file) 31 and the color data 32 will be explained.

In FIG. 3, the part shown by reference numeral 51 shows the common platform relating to the conversion and inverse conversion in the computer 10. In the common platform 51, in FIG. 3, the right side region shows the color encoding flow 51A according to the information replacement route (information replacement type), while the left side region shows the color encoding flow 51B according to the information conversion route (information conversion type). Further, the region positioned at the right side of the color encoding flow 51A of the information replacement route shows an example of the color conversion table (color encoding table) 51C set in the conversion unit 33, the color inverse conversion table (color decoding table) 51D set in the inverse conversion unit 34, and the application 51E.

In the flow of the information replacement route 51A, at the conversion side 51A-1, the color conversion table 51C is used for replacement (information replacement) of a computer object (in this case, an object file, in FIG. 3, expressed by the symbol "O")→color number (in FIG. 3, expressed by the symbol "N")→color data (in FIG. 3, expressed by the symbol "C") (information replacement). The color number is a numerical value suitably assigned for the purpose of discriminating different colors. In this replacement (information replacement), as the color conversion table 51C, typically, preferably an "ONC correspondence table" is used. Note that it is also possible to omit the intermediate color numbers. In this case, as the color conversion table 51C, an "OC correspondence table" is used.

The above color conversion table 51C has the action of object matching (OM) for linking computer objects (O) with the color data (C).

As the color conversion table 51C, for example, a language dictionary (standard), any prepared user dictionary, character codes, etc. may be used.

Further, if changing the viewpoint, the above color conversion table 51C ("ONC correspondence table" or "OC correspondence table") functions as a color encoding table for replacing computer objects with color data encoding them.

The color data (C) prepared by the conversion, as explained above, forms a color image file comprised of a color code image or color image. In other words, the color data, that is, color image file, is handled as a bit map (BMP) image 52 as shown in FIG. 3.

Further, at the inverse conversion side 51A-2 of the information replacement route 51A, the color inverse conversion table 51D is used for color data (C) (color image file)→color value (N)→computer object (O) (document file etc.) conversion. In this conversion, the "ONC correspondence table" or "OC correspondence table" explained above as the color inverse conversion table 51D is used.

Further, the flow of the information conversion route 51B is provided as separate from the flow of the above information replacement route 51A. In the information conversion route 51B, at the conversion side 51B-1, "byte/binary file"→pseudo colorization conversion is performed for the "byte/binary file" in the computer object (O), then the above color coding key 54 is used to convert the object to the above color data (C) (color image files). The above content of the conversion side 51B-1 at the information conversion route 51B corresponds to the above conversion side 51A-1 of the information replacement route 51A.

Further, at the inverse conversion side 51B-2 of the information conversion route 51B, the pseudo colorization→"byte/binary file" conversion is performed. In this conversion, the above color encoding key 54 is used.

In the flow of the information conversion route 51B, the conversion side 51B-1 performs the "byte/binary file"→data compression→pseudo colorization conversion for the "byte/binary file" in the computer object (O), then uses the above color encoding key 54 to convert this to the above color data (C). Further, in this case, at the inverse conversion side 515-1 of the information conversion route 51B, the color encoding key 54 is used to convert the color data (C) to the pseudo colorization data, then the pseudo colorization→data expansion→"byte/binary file" conversion is performed. In this conversion as well, the color encoding key 54 is used.

In the above, the bit map image 52 (color image file) after converting the computer object (O) (object file) to color data (C) is in a common data state at the information replacement route 51A and information conversion route 51B. The color data 32 converted at the computer 10 is shown in FIG. 3 as the bit map image 52. There, the generally several or large number of "color image files" stored in the hard disk 21 etc. of the computer 10 have the format of bit map images 52.

The above bit map images 52, that is, the color image files handled in the computer 10 or stored in the storage memory (the hard disk 21 etc.), are used as color encoded files etc. for the application 51E. Further, they can be sent from the computer 10 to another computer (PC) 26 or to the mobile phone 28 etc. utilizing the Internet 53.

Figure 4:
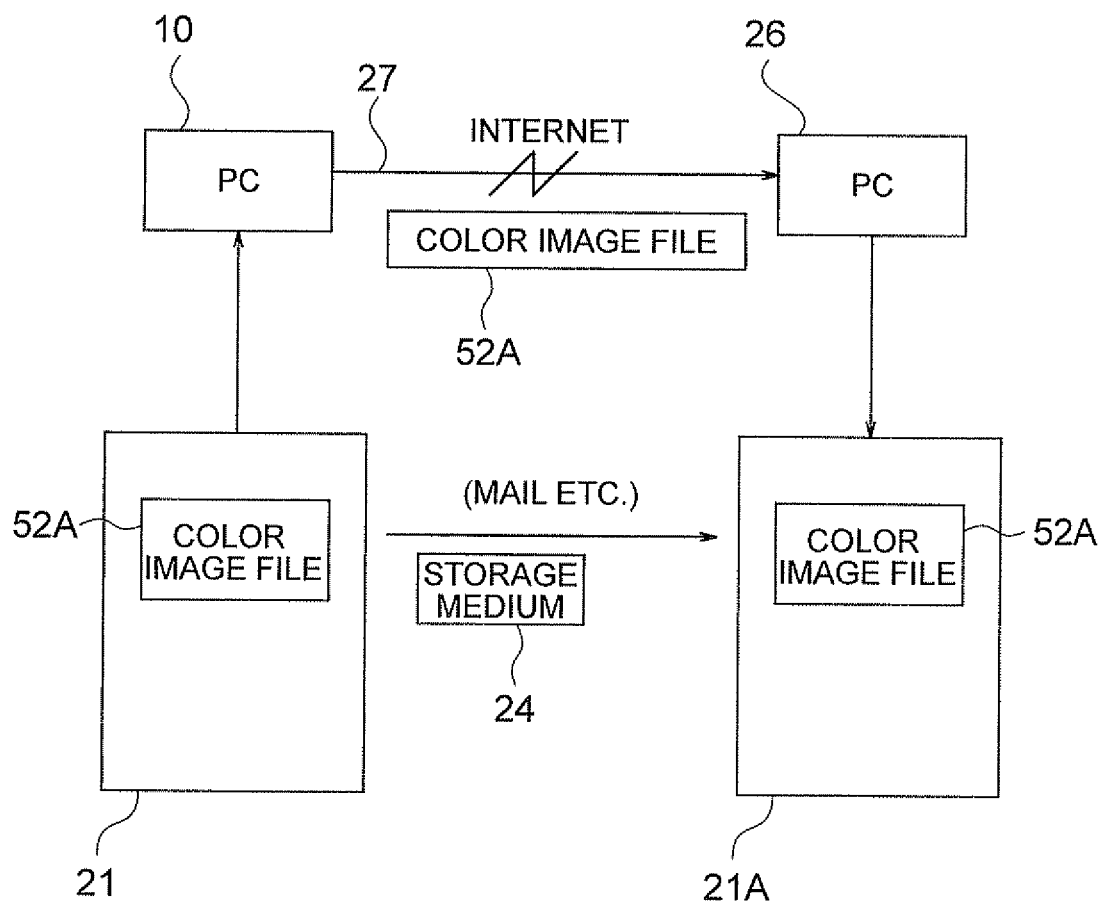
FIG. 4 is a view of the configuration for handling color image files between two computers at distant locations.

FIG. 4 shows an example of the transfer of a color image file using the Internet. This is an example of storing one color image file 52A stored on the hard disk 21 at the computer (PC) 10 side in the hard disk 21A of another computer (PC) 26. The computer 10 calls up the color image file 52A stored on the hard disk 21 and sends it through the Internet interface 25 and Internet 27 to another computer 26. The computer 26 stores the received color image file 52A in the state as is at the hard disk 21A. Further, as another method, the color image file 52A can be stored in the above-mentioned storage medium 24 and be sent by physical mail etc. to the computer 26 side. In this case, a person sets the storage medium 24 in the computer 26, reads out the color image file 52A from the storage medium 24, and stores it in the hard disk 21A.

As explained above, the conversion unit 33 has an information conversion or information replacement function realized based on the color conversion table 51C, color inverse conversion table 51D, or color encoding key 54 provided in the hard disk 21 etc. As the content of this color conversion table 51C etc., the color conversion table 51C etc. is determined in any way in advance in accordance with the content of the computer objects 31 and the content of the color data 32 to be linked. In FIG. 2, among the computer objects 31, one, several, or a large number of computer objects (object files) are included. Each of the plurality of computer objects, as explained above, is a document, text, symbols, graphics, numerical equations, image, audio, or other data etc. or programs able to be handled by the computer 10. The elements included in the computer objects 31 are color encoded in accordance with their contents based on the above-mentioned information conversion type or information replacement type.

In the table shown in FIG. 5, two types of color conversion processing, that is, the information conversion route and information replacement route, are shown in comparison for the "processing scheme", "data covered", "encoding mediation data", and "encoding method".

Next, referring to FIG. 6 to FIG. 9, the preparation (color encoding) and handling of a color image file (color encoded file) based on the information conversion/information replacement conversion function and a color search will be explained.

FIG. 6 is a block diagram showing the process of preparation (color encoding) of a color image file (color encoded file) based on the information conversion/information replacement conversion function. The color encoding process is executed in the memory 13 of the computer 10.

A block 13 of FIG. 6 schematically shows the above memory 13 shown in FIG. 1. In this, for convenience, the conversion unit 33 and the inverse conversion unit 34 are shown by blocks. According to the conversion unit 33 and inverse conversion unit 34, the document file 31A etc. (object file) is converted to the color image file 52A based on the color encoding function of the conversion unit 33 (information conversion/information replacement function), and conversely the color image file 52A is converted to a document file 31A etc. based on a restoration function of the inverse conversion unit 34 (inverse conversion function). Note that the operation of the conversion and inverse conversion function of the conversion unit 33 and inverse conversion unit 34 is designated by the conversion key 55. The conversion key 55 is an element comprised of a color code table (ONC correspondence tables 51C and 51D) or color encoding key 54.

A large number of color image files 52A prepared by the conversion function based on the conversion unit 33 and inverse conversion unit 34 are stored in the hard disk 21. Between the memory 13 and the hard disk 21, in accordance with need, the color image file 52A is stored or the color image file 52A is taken out.

Figure 7:
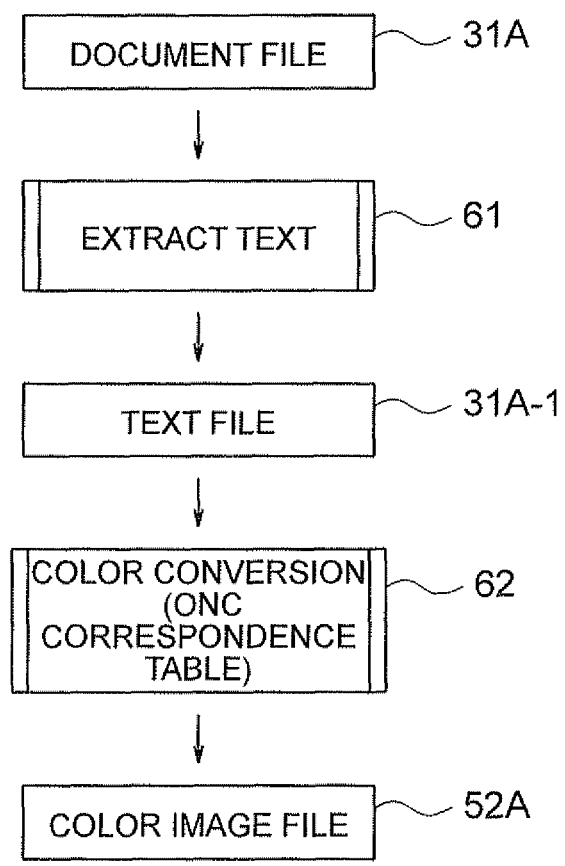
FIG. 7 is a flow chart for explaining a process for converting a document file to a color image file.

FIG. 7 shows the processing flow for color encoding explained in FIG. 6, in particular information replacement type conversion. For example, the document file 31A is usually a binary form, so text is extracted from the document file 31A. In FIG. 7, text extraction processing 61 is executed to extract the text file 31A-1 from the covered document file 31A. For this text extraction processing 61, for example, a full text search use text extraction tool is used. Further, the extracted text file 31A-1 is processed by color conversion processing 62 utilizing the ONC correspondence table to prepare the above color image file 52A. This color image file 52A is a color image file encoded by information replacement.

Examples of the above ONC correspondence table are as follows:

(1) When a character code is used, in Japanese, it is the "JIS code", "shift JIS code", "unicode", etc., while in English, it is the "ASCII code".

(2) When a dictionary is used, for example, it is a general dictionary or specialized dictionary of 65,000 or so words. More specifically, for example, it may be a language dictionary, industrial dictionary, scientific dictionary, etc.

(3) In addition, it may be a combination of the file format and the above character codes or a combination of the file format and the above dictionaries. Note that here, "file format" means an HTML tag or other font tag.

In the above color encoding process, for the timing or time-wise control for encoding a plurality of computer objects 31, that is, document files, present in the memory 13, the encoding may be performed successively. Alternatively for example, when encoding all computer objects 31 by color encoding, the color encoding may be performed in accordance with the set times. Furthermore, the color encoding may be performed by block designation (groups of designated files or designated parts of designated files). Such color encoding processing may be performed by selectively performing color encoding processing or performing it in accordance with the situation of utilization.

Figure 8:
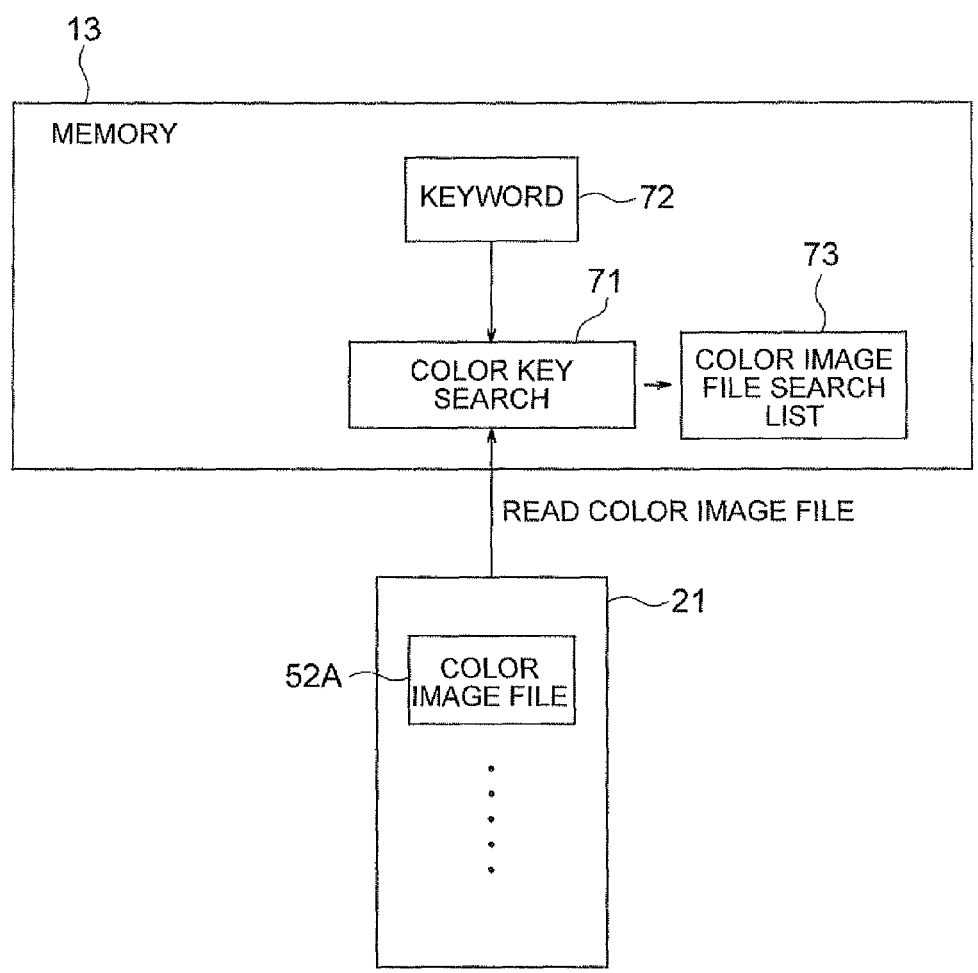
FIG. 8 is a block diagram showing the configuration for executing a color search for a large number of color image files prepared, stored, and managed by color conversion technology on a computer.

Referring to FIG. 8, a color search will be explained. In the constitution of FIG. 8, as explained with reference to the FIG. 6, a large number of color image files 52A prepared based on information replacement by the conversion unit 33 are stored in the hard disk 21. In this state, a color search is executed by the color search processing unit 71. The processing by the color search processing unit 71 is executed by calling up a large number of color image files 52A in the memory 13. The color search processing unit 71 is expressed in the form of a block present in the memory 13.

In the color search by the color search processing unit 71, a "color key" is used. This color key is prepared based on a search use key word (search key) 72 provided by an external input means etc.

Figure 9:
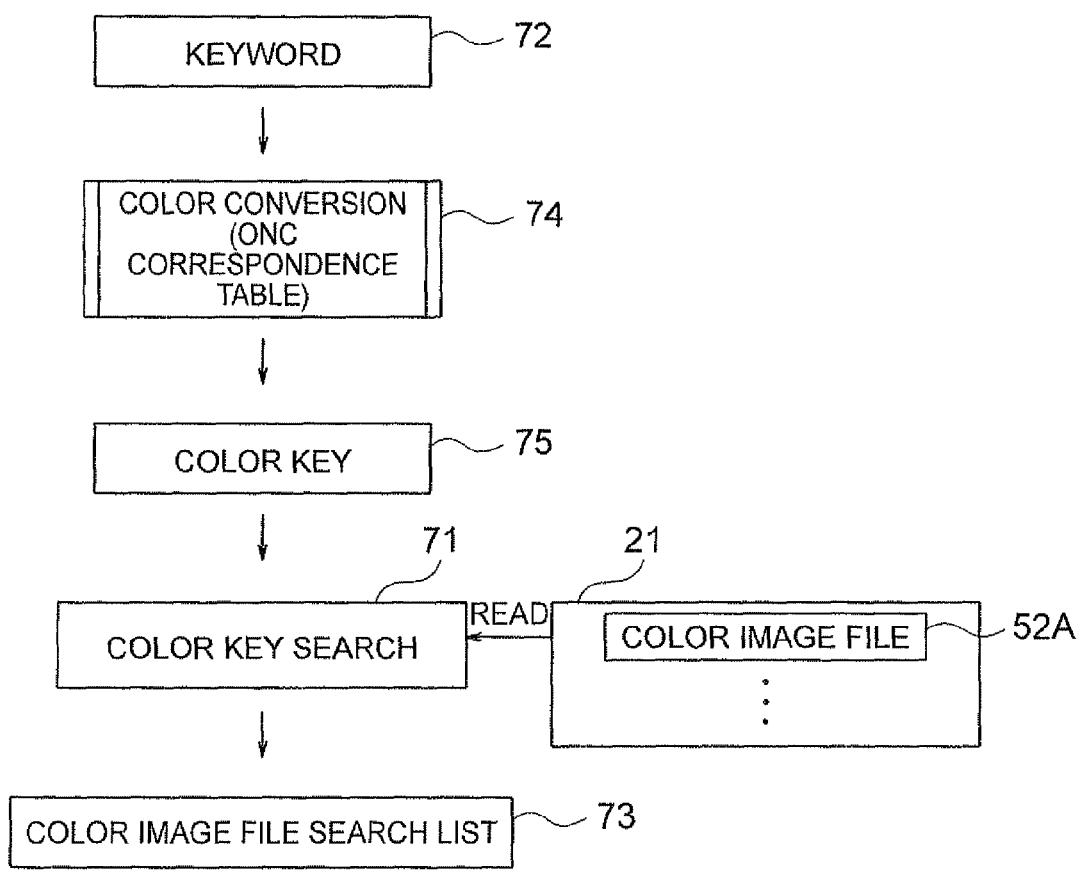
FIG. 9 is a flowchart showing the flow of processing according to a color search.

FIG. 9 shows the method for preparing a search use color key. In FIG. 9, a search use key word 72 which can be used for searching through a document file (text file) is processed by color conversion processing 74 utilizing the ONC correspondence table to prepare a color key 75.

After that, as shown in FIG. 8 and FIG. 9, the color key 75 is used to search through the large number of color image files 52A stored in the hard disk 21 by color search processing by the color search processing unit 71. Due to this, a search list 73 of the color image files is prepared.

The above search use color key 75 is a specific color code element showing the search coverage. When the color image file 52A includes that color key 75, that is, a specific color code element, the search "hits" a file and the file identifying data (file name, index data, etc.) is taken out from the color image file including the color key 75. Based on the plurality of file identifying data taken out, the search list 73 of the color image files is prepared and stored in the memory 13.

Figure 10:
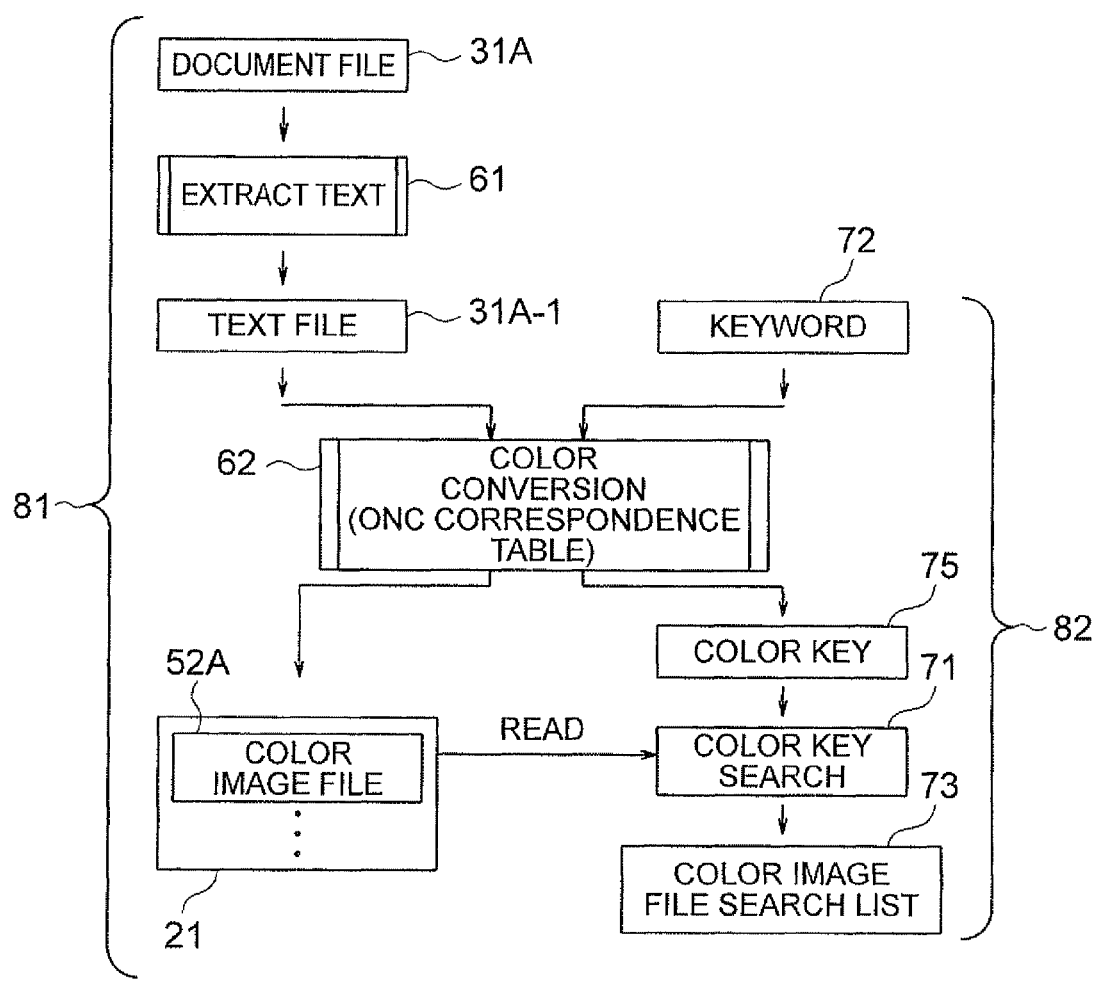
FIG. 10 is a flowchart showing the flow of color encoding processing and the flow of color search processing by color conversion technology together.

FIG. 10 is an overall view of the configuration showing the color encoding processing flow and color search processing flow all together. In FIG. 10, in the left side processing route 81, the process for converting a document file 31A to the color image file 52A (color encoding processing flow) is shown. In this conversion process 81, the text file 31A-1 is extracted from the document file 31A by the text extraction processing 61 and the text file 31A-1 is converted by the information replacement type color conversion processing 62 utilizing the ONC correspondence table to prepare the color image file 52A. In this way, a large number of color image files 52A are prepared and these color image files 52A are stored in the hard disk 21. On the other hand, in the right side processing route 82, based on the key word 72, the information replacement type color conversion processing 62 utilizing the same ONC correspondence table is used to prepare the color key 75 and the color key 75 is used as explained above for the color search processing 71 to prepare the search list 73 of color image files.

Figure 11:
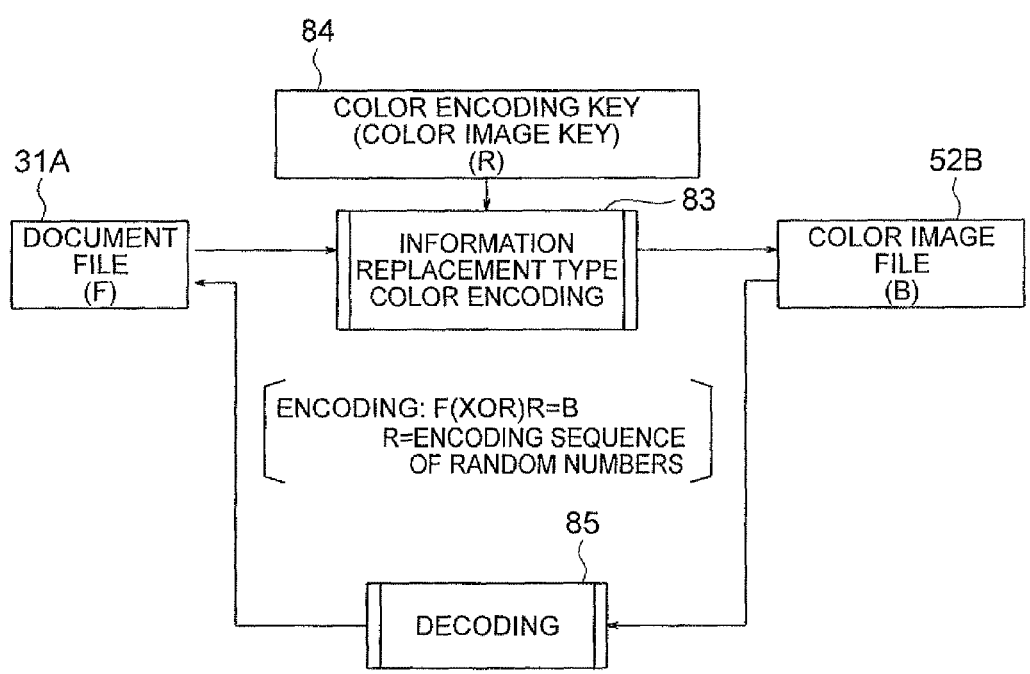
FIG. 11 is a flowchart showing the relationship between a document file and a color image file based on information conversion type color encoding.

FIG. 11 shows the process for encoding the object file, that is, the document file 31A etc., by color encoding by the information conversion type conversion function. The block 83 is the conversion unit which performs the information conversion type color encoding processing. The information conversion type color encoding processing 83 is performed using the color encoding key (color image key) 84. Due to this, the document file 31A is converted to the color image file 52B. Further, the color encoding key 84 can be used for inverse processing to provide the decoding processing 85. According to this decoding processing 85, it is possible to convert the color image file 52B to the document file 31A.

The information conversion type color encoding processing 83 shown in FIG. 11 can be expressed as follows by a mathematical formula. When the document file 31A is represented by "F", the color image file 52B is represented by "B", and the color coding key 84 is represented by "R", $$\text{Encoding: } F(\text{XOR})R = B$$

where, an encoding sequence of random numbers is used for R.

Figure 12:
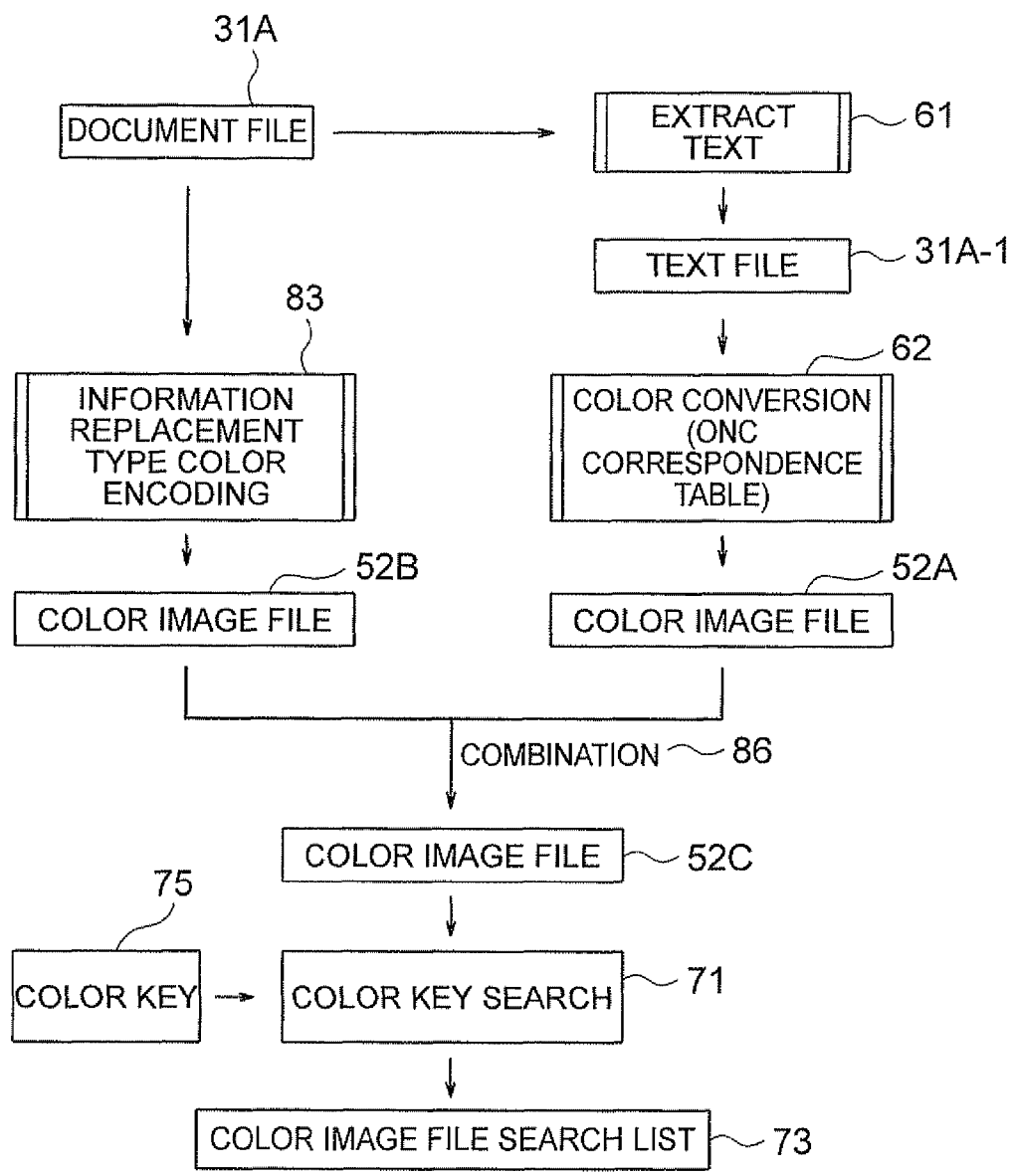
FIG. 12 is a flowchart showing the flow of color encoding processing encoding a single document file by information conversion type color encoding and information replacement type color encoding and the flow of color search processing.

FIG. 12 shows another embodiment of the flow of processing for color encoding and color search.

This processing flow includes a route of converting the document file 31A to the color image file 52B based on the information conversion type color encoding processing 83 and a route of extracting the text file 31A-1 by the text extraction processing 61 from the same document file 31A and using the text file 31A-1 to prepare the color image file 52A based on the information replacement type color conversion processing 52. The two prepared the color image files 52A and 52B are combined (86) whereby the combined new color image file 52C is prepared. Further, such combined color combination files 52C are searched using the color key 75 by the color search processing 71 whereby the search list 73 of the color image files is prepared. In color search processing 71 by the color key 75, only the color image file 52A parts of the combined color image files 52C are searched through.

According to the above configured color search, the color image files 52 able to be searched by a color search are linked with the color image files 52B unable to be searched by the color search so as to enable each of a large number of color image files 52C to be searched through by the color search.

Figure 13:
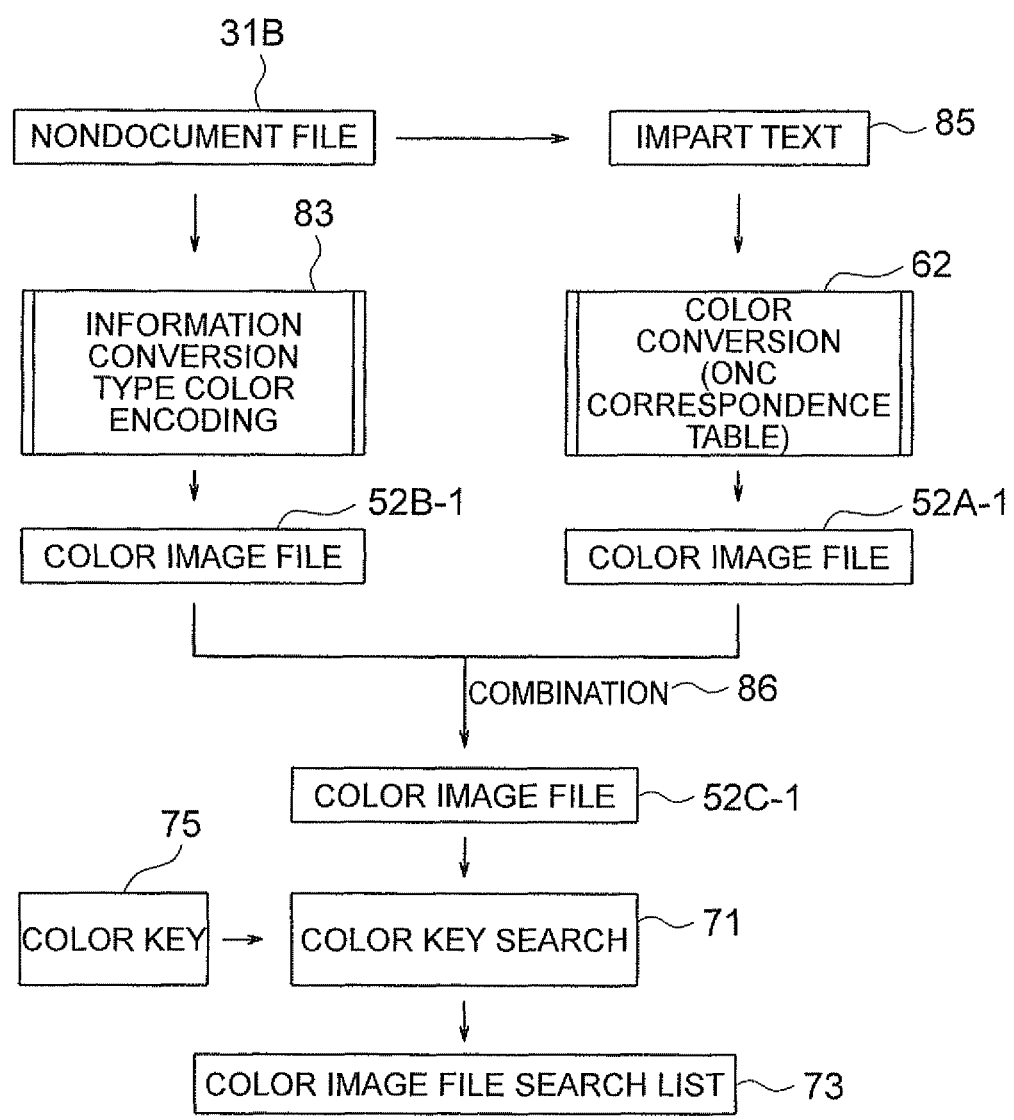
FIG. 13 is a flowchart showing the flow of color encoding processing and color search processing on a nondocument file together.

FIG. 13 shows an embodiment of the flow of processing for color encoding and color search for a nondocument file.

This processing flow includes, first, a route of converting the nondocument file 31B to the color image file 52B-1 based on the information conversion type color encoding processing 83 and, further, a route of processing the same nondocument file 31B by processing imparting text 85 to thereby impart suitable text to the nondocument file 31B and further using just the text to prepare the color image file 52A-1 based on the information replacement type color conversion. The two prepared color image files 52A-1 and 52B-1 are combined (86) whereby a combined new color image file 52C-1 is prepared. Further, such combined color combination files 52C-1 are searched using a color key 75 by the color search processing 71 whereby the search list 73 of the color image files is prepared. In color search processing 71 by the color key 75, only the color image file 52A-1 parts of the combined color image files 52C-1 are searched.

According to the above configured color search, since the files are originally nondocument files, suitable text is added to the color image files 52B-1 unable to be searched by a color search so as to link the color image files 52A-1 able to be searched by a color search based on text with the color image files 52B-1 and thereby enable each of a large number of color image files 52C-1 to be searched by the color search.

The configurations, shapes, sizes, and relative layouts explained in the above embodiments are only shown schematically to an extent enabling the present invention to be understood and worked. Therefore, the present invention is not limited to the embodiments explained above and can be changed in various ways so long as not departing from the scope of the technical ideas shown in the claims.

This disclosure relates to subject matter included in Japanese Patent Application No. 2009-230637 filed on Oct. 2, 2009. The content of the disclosure is incorporated by reference here in its entirety.

The invention claimed is:

1. A searchable color encoded file composing method comprising:
   a step of converting a plurality of document files or image files to color image files based on information replacement type color conversion processing, which is prepared based on an ONC correspondence table, wherein "O" represents computer object, "N" represents color number, and "C" represents color data,
   a step of storing the plurality of color image files prepared in the color conversion processing in a storage memory,
   a step of searching through the plurality of color image files stored in the storage memory by a color key, and
   a step of preparing a list of color image files hit by the search.

2. A searchable color encoded file composing method as set forth in claim 1, further comprising a step of converting a search key for searching through the plurality of document files or image files by the color conversion based on the information replacement type color conversion processing so as to prepare the color key.

3. A searchable color encoded file composing method as set forth in claim 1, wherein character codes are used for the part of the object list of the ONC correspondence table.

4. A searchable color encoded file composing method as set forth in claim 1, wherein a dictionary including a predetermined number of word data is used for the part of the object list of the ONC correspondence table.

5. A searchable color encoded file composing method as set forth in claim 1, wherein elements comprised of a file format and character code are used for the part of the object list of the ONC correspondence table.

6. A searchable color encoded file composing method as set forth in claim 1, wherein elements comprised of a file format and a dictionary including a predetermined number of word data are used for the part of the object list of the ONC correspondence table.

7. A searchable color encoded file composing method as set forth in claim 1, when the document files or image files are in a binary form, comprising a step of extracting text from the document files or image files by a document filter corresponding to the file format, and then a step of converting the plurality of document files or image files to color image files based on the ONC correspondence table.

8. A searchable color encoded file composing method as set forth in claim 7, wherein text objects of the text are converted to colors through color numbers based on the ONC correspondence table.

9. A searchable color encoded file composing method as set forth in claim 1, wherein the storage memory in which the color image files are stored is any of a hard disk or portable storage medium of a personal computer or a built-in memory or memory card of a mobile phone.

10. A searchable color encoded file composing method as set forth in claim 1, wherein the color encoded color image files are handled over the Internet or through a portable type storage medium.

11. A searchable color encoded file composing method comprising:
    a step of converting a plurality of document files or image files to first color image files based on information conversion type binary type color conversion processing,
    a step of converting the plurality of document files or image files to second color image files based on information replacement type color conversion processing,
    a step of combining the first color image file and second color image file for each of the plurality of document files or image files to prepare third color image files,
    a step of storing the plurality of third color image files in a storage memory,
    a step of searching through the plurality of third color image files stored in the storage memory by a color key, and
    a step of preparing a list of the third color image files hit by the search.

12. A searchable color encoded file composing method comprising:
    a step of converting a plurality of nondocument files not able to be searched by a key search to first color image files based on information conversion type binary type color conversion processing,
    a step of imparting related text to the plurality of nondocument files,
    a step of converting the plurality of text-carrying nondocument files to second color image files based on information replacement type color conversion processing,
    a step of combining the first color image file and second color image file for each of the plurality of nondocument files to prepare third color image files,
    a step of storing the plurality of third color image files in a storage memory,
    a step of searching through the plurality of third color image files stored in the storage memory by a color key, and
    a step of preparing a list of the third color image files hit by the search.

13. A searchable color encoded file system used in a single computer or its peripheral devices or a computer system comprised of a plurality of computers connected by a communication line, comprised of:
    a converting means for converting a plurality of document files or image files to color image files based on information replacement type color conversion processing, which is prepared based on an ONC correspondence table, wherein "O" represents computer object, "N" represents color number, and "C" represents color data,
    a storing means for storing the plurality of color image files prepared in the color conversion processing in a storage memory,
    a searching means for searching through the plurality of color image files stored in the storage memory by a color key, and
    a list preparing means for preparing a list of color image files hit by the search.

14. A searchable color encoded file system as set forth in claim 13, wherein the color key is prepared by converting a search key for searching through the plurality of document files or image files by the color conversion based on the information replacement type color conversion processing.

15. A searchable color encoded file system as set forth in claim 13, wherein character codes are used for the part of the object list of the ONC correspondence table.

16. A searchable color encoded file system as set forth in claim 13, wherein a dictionary including a predetermined number of word data is used for the part of the object list of the ONC correspondence table.

17. A searchable color encoded file system as set forth in claim 13, wherein elements comprised of a file format and character code are used for the part of the object list of the ONC correspondence table.

18. A searchable color encoded file system as set forth in claim 13, wherein elements comprised of a file format and a dictionary including a predetermined number of word data are used for the part of the object list of the ONC correspondence table.

19. A searchable color encoded file system as set forth in claim 13, wherein, when the document files or image files are in a binary form, text from the document files or image files are extracted by a document filter corresponding to the file format, and then the plurality of document files or image files is converted to color image files based on the ONC correspondence table.

20. A searchable color encoded file system as set forth in claim 19, wherein text objects of text are converted to color through color numbers based on the ONC correspondence table.

21. A searchable color encoded file system as set forth in claim 13, wherein the storage memory in which the color image files are stored is any of a hard disk or portable storage medium of a personal computer or a built-in memory or memory card of a mobile phone.

22. A searchable color encoded file system as set forth in claim 13, wherein the color encoded color image files are handled over the Internet or through a portable type storage medium.

23. A searchable color encoded file system comprising:
a first converting means for converting a plurality of document files or image files to first color image files based on information conversion type binary type color conversion processing,
a second converting means for converting the plurality of document files or image files to second color image files based on information replacement type color conversion processing,
a combining means for combining the first color image file and second color image file for each of the plurality of document files or image files to prepare third color image files,
a storing means for storing the plurality of third color image files in a storage memory,
a searching means for searching through the plurality of third color image files stored in the storage memory by a color key, and
a list preparing means for preparing a list of the third color image files hit by the search.

24. A searchable color encoded file system comprising:
a first converting means for converting a plurality of nondocument files not able to be searched by a key search to first color image files based on information conversion type binary type color conversion processing,
an imparting means for imparting related text to the plurality of nondocument files,
a second converting means for converting the plurality of text-carrying nondocument files to second color image files based on information replacement type color conversion processing,
a combining means for combining the first color image file and the second color image file to prepare a third color image file for each of the plurality of nondocument files,
a storage executing means for storing the plurality of third color image files in a storage memory,
a searching means for searching through the plurality of third color image files stored in the storage memory by a color key, and
a list preparing means for preparing a list of third color image files hit by the search.

* * * * *